(12) United States Patent
Hostetter

(10) Patent No.: US 6,301,646 B1
(45) Date of Patent: Oct. 9, 2001

(54) POINTER VERIFICATION SYSTEM AND METHOD

(75) Inventor: Mathew J. Hostetter, Cambridge, MA (US)

(73) Assignee: Curl Corporation, Cambridge, MA (US)

( * ) Notice: Subject to any disclaimer, the term of this patent is extended or adjusted under 35 U.S.C. 154(b) by 0 days.

(21) Appl. No.: 09/364,468

(22) Filed: Jul. 30, 1999

(51) Int. Cl.$^7$ ................................................ G06F 12/10
(52) U.S. Cl. ........................... 711/206; 711/156; 711/170
(58) Field of Search ................................. 711/205, 208, 711/209, 206, 207, 156, 170, 171, 172, 173

(56) References Cited

U.S. PATENT DOCUMENTS 6,088,780 * 7/2000 Yamada et al. ...................... 711/206

OTHER PUBLICATIONS

Jones, R., et al., "Garbage Collection for C" in *Garbage Collection, Algorithms for Automatic Dynamic Memory Management*, (West Sussex, England: John Wiley & Sons, Ltd.), pp. 233–235 (1996).

\* cited by examiner

*Primary Examiner*—Hiep T. Nguyen
(74) *Attorney, Agent, or Firm*—Hamilton, Brook, Smith & Reynolds, P.C.

(57) ABSTRACT

A system and method for allocating memory blocks and indexing the pointer to the memory blocks in a set of tables. The tables translate the pointers to the memory blocks enabling the efficient lookup of pointers during translation and garbage collection. The memory blocks further include structures for facilitating the indexing into tables and referencing pointers into allocated memory.

27 Claims, 9 Drawing Sheets

POINTER VERIFICATION SYSTEM AND METHOD

BACKGROUND OF THE INVENTION

In recent years, the number of users on the Internet has increased exponentially. With this increase in popularity, there has also come an increased demand for languages that enhance the "on-line" experience. To this end, new object-oriented computer-programming languages such as Curl™ and JAVA™ have been developed, which ostensibly provide not only platform independence, but also increased functionality.

A common problem for these languages is the utilization of memory. These languages allocate memory from free storage and reclaim ("garbage collect") the allocated memory once it is no longer in use. An important aspect of garbage collection is the mapping of object pointers to information about those pointers. Thus, a set of auxiliary data structures are used for things like marking the object "alive" and figuring out which other objects this one points to. The problem of finding this data is compounded in conservative garbage collectors where pointers to objects are followed and the memory utilized by those objects is reclaimed only under a conservative standard.

In such systems, a value that looks like a pointer may in fact be junk with no associated information. Therefore, a system for efficient determination of the validity of a pointer is needed.

SUMMARY OF THE INVENTION

This invention executed on a computer, provides an efficient and compact way to map pointers to auxiliary data by which the validity of pointers can be determined. The invention relies on a data structure which can be efficiently updated as a memory is allocated to memory blocks and as those memory blocks are deallocated. The data structure allows for efficiently determining whether a particular pointer or set of pointers points to a valid portion of allocated memory.

In accordance with one aspect of the invention, a table of the memory pages may be indexed by each pointer during memory allocation, deallocation, and status checking. An index entry in the table points to a memory block which contains at least a portion of the indexed page. Memory blocks, including memory blocks of multiple pages, into which the memory pointers point, indicate whether the pointer is valid. For example, each memory block may include an array of bits, each associated with a word in the memory block to indicate whether the pointer to that word is valid. A memory block which covers multiple pages will have a table entry for each page, each entry pointing to the same memory block which provides the information required to determine whether the pointer is valid.

Where more than one memory block overlaps an indexed page, it is preferred that the table entry point to only one of the overlapping memory blocks and that the memory block, to which the indexed table entry points, itself points to any other memory block overlapping the indexed page. Preferably, each memory block in the system is at least the size of one page so that the information is found in either the memory block to which the table entry points or a single memory block to which that memory block points.

In accordance with the preferred embodiment, each memory block allocated from a pool of free memory has a size that is at least as large as a predefined page size and further includes slots for storing representations (such as an address or index) of a starting address, an ending address, a next memory block address, and data. The slot for the representation of a starting address is initialized with a representation of the starting address of the data; the slot for the representation of an ending address is initialized with a representation of the ending address of the data; and if a previously created memory that starts on the last page of this memory block exists, a representation of the address of this newly created memory block is entered in the next memory block address slot of the previously allocated memory block.

Each of the pages in the memory block is indexed into a set of tables. In a system with two page tables, the first page table is checked for an entry found by indexing into the first page table with a first portion of the address to the first page of the memory block. If the entry is null, then a second page table is created, this page table having a set of entries for storing representations of addresses to memory blocks. An entry is created in the first page table entry selected by the first portion of the address of the memory block to store a representation of the address of the second page table. In addition, in the second page table, at the entry selected by a second portion of the address of the memory block, an entry is created for a representation of the address to the memory block.

If the entry in the first page table is not null, then the second page table is selected by using the representation of the address to the second page table found in the first page table. A second page table entry is found by indexing into the second page table with the second portion of the address of the page of the memory block, and if this entry is null, entering the representation of the memory block address.

If this page entry is not null, then a previously indexed memory block is present. If this is the first page of the memory block in question, then the previously indexed memory block starts on this page. A representation of the address of this newly created memory block is then entered in the next memory block address slot of the previously allocated memory block. If this is not the first page of the memory block in question, then the previously indexed memory block ends on this page. A representation of the address of this newly created memory block is then entered into to the second page table entry and the former contents of this entry are placed in the next memory block address slot of the newly allocated memory block. This also represents the ending page of the newly allocated memory block and thus the method is complete.

The invention further includes a system and method for determining the validity of a pointer in a system having a first page table, a set of zero or more second page tables, and a set of zero or more memory blocks. The first page table has a sequence of for storing representations of addresses for a second page table; the second page table has a sequence of entries for storing representations of addresses for a memory block; and the memory blocks have slots to store representations of a starting address, an ending address, a next memory block address, and data.

The system and method utilize the steps of checking for an entry in the first page table found by indexing into the first page table with a first portion of the address of the pointer. If the entry thus found is null, then the pointer is invalid. If the entry is not null, then a second page table is selected using the representation of the address to the second page table found in the entry from the first page table. The second page table is checked by indexing into the table with the second portion of the pointer. If the entry thus found is null, the pointer is invalid. If the entry is not null, then a memory block is selected from the set of one or more memory blocks using the entry in the second page table. The pointer is then checked for validity in the selected memory block or in a separate memory block pointed to by the selected memory block.

Thus, the system and method can efficiently allocate memory blocks. In addition, the system and method can determine the validity of a pointer via a series of table lookups.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
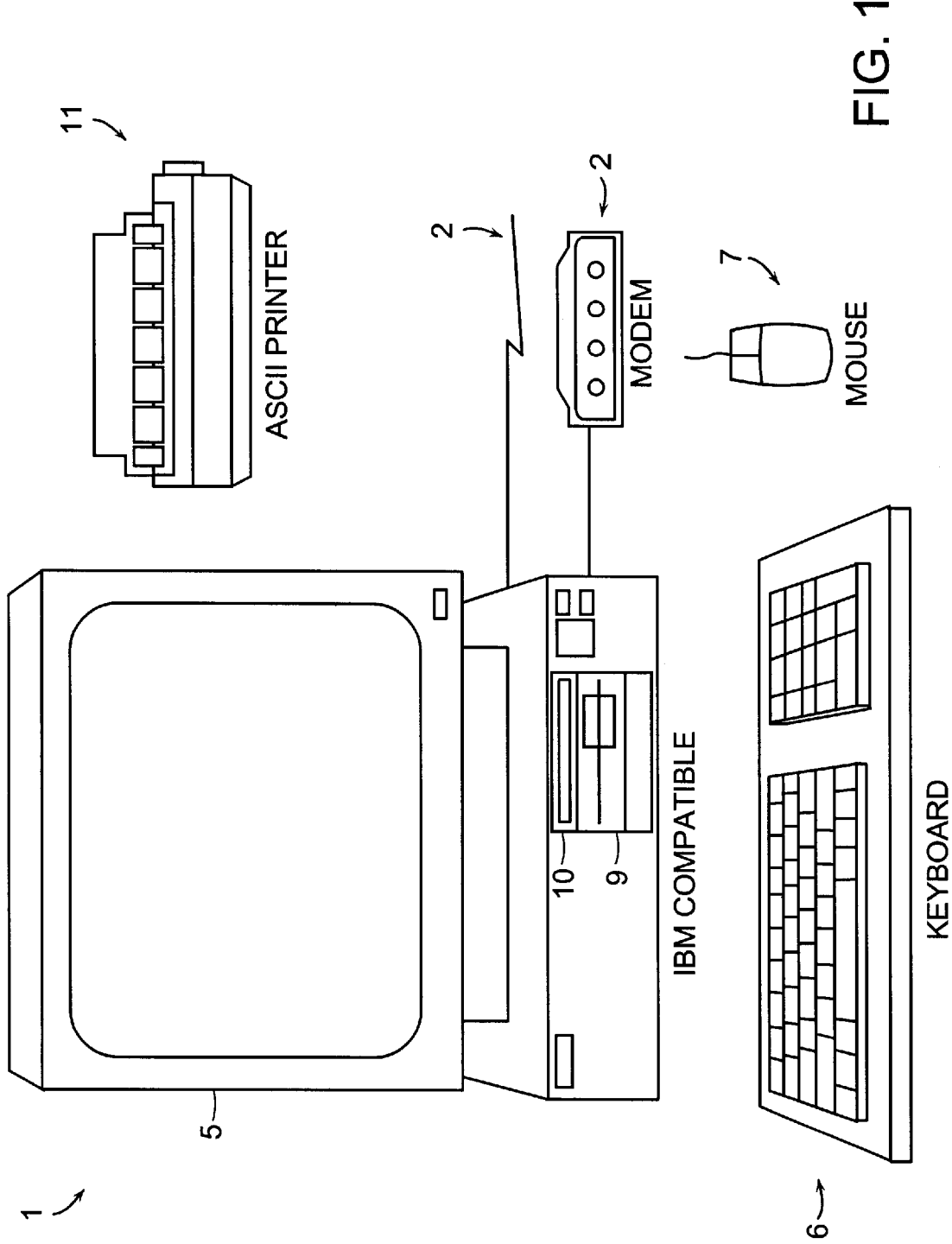
FIG. 1 is a diagram illustrating a computer system for implementing garbage collection utilizing the invention.

FIG. 1 shows an example of a personal computer (PC) on which the present invention may be implemented. As shown, PC 1 includes a variety of peripherals, among them being: i) network connection 2 for interfacing to a network or internet, ii) a fax/modem 4 for interfacing with telecommunication devices (not shown), iii) a display screen 5 for displaying images/video or other information to a user, iv) a keyboard 6 for inputting text and user commands and a mouse 7 for positioning a cursor on display screen 5 and for inputting user commands, and v) a set of disk drives 9 for reading from and writing to a floppy disk, a CDROM and/or a DVD. PC 1 may also have one or more local peripheral devices connected thereto, such as printer 11.

Figure 2:
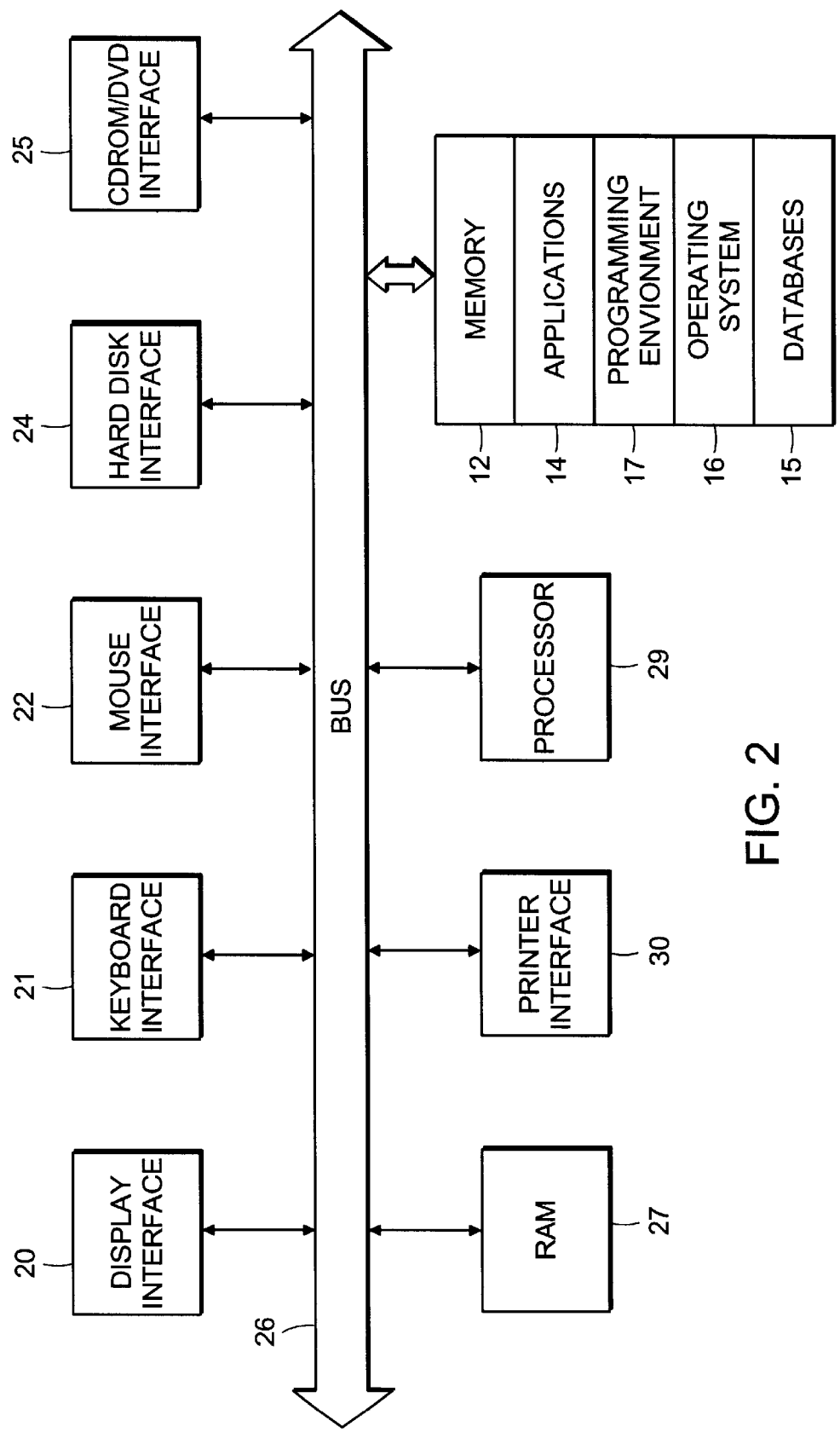
FIG. 2 is a block diagram illustrating the components in a computer system for implementing garbage collection utilizing the invention.

FIG. 2 shows the internal structure of PC 1. As illustrated, PC 1 includes mass storage 12, which comprises a computer-readable medium such as a computer hard disk and/or RAID ("redundant array of inexpensive disks"). Mass storage 12 is adapted to store applications 14, databases 15, and operating systems 16. In preferred embodiments of the invention, the operating system 16 is a windowing operating system, such as RedHat® Linux or Microsoft® Windows98, although the invention may be used with other operating systems as well. Among the applications stored in memory 12 is a programming environment 17 and source files. Programming environment 17 compiles the source files written in a language that creates the output generated by the present invention. In the preferred embodiment of the invention, this language is Curl™, developed by Curl™ Corporation of Cambridge, Mass.

PC 1 also includes display interface 20, keyboard interface 21, mouse interface 22, disk drive interface 24, CDROM/DVD drive interface 25, computer bus 26, RAM 27, processor 29, and printer interface 30. Processor 29 preferably comprises a Pentium II® (Intel Corporation, Santa Clara, Calif.) microprocessor or the like for executing applications, such those noted above, out of RAM 27. Such applications, including the programming environment and/or the present invention 17, may be stored in memory 12 (as above) or, alternatively, on a floppy disk in disk drive 9. Processor 29 accesses applications (or other data) stored on a floppy disk via disk drive interface 24 and accesses applications (or other data) stored on a CDROM/DVD via CDROM/DVD drive interface 25.

Application execution and other tasks of PC 1 may be initiated using keyboard 6 or mouse 7, commands from which are transmitted to processor 29 via keyboard interface 21 and mouse interface 22, respectively. Output results from applications running on PC 1 may be processed by display interface 20 and then displayed to a user on display 5 or, alternatively, output to a network via network connection 2. To this end, display interface 20 preferably comprises a display processor for forming images based on image data provided by processor 29 over computer bus 26, and for outputting those images to display 5.

During normal operation, the system allocates objects within defined memory blocks of varying size to individual applications. When an application no longer requires a memory object, the words which make up that object can be indicated as invalid until required again by the application. When a memory block is no longer required, and all words within it are invalid, the memory block is deallocated and is thus available to be allocated to another application. To keep track of any valid pointers which point to locations within allocated memory, the present invention relies on a novel data structure comprising a sparse two-level page table. For any pointer which is valid, there is an entry in the page table which points to a descriptor of the memory block, preferably in a header to the memory block. The descriptor may, for example, be an array of bits which indicate whether individual words within the memory block are valid.

In one embodiment of the invention, a set of tables is created to facilitate the translation of pointers during garbage collection (See, Garbage Collection, Jones, Richard and Lins, Rafael, John Wiley & Sons, 1996, whose teachings are incorporated herein by reference.) The tables are indexed by subdividing the pointer into portions and utilizing the portions to index into the set of tables.

Figures 3, 3A:
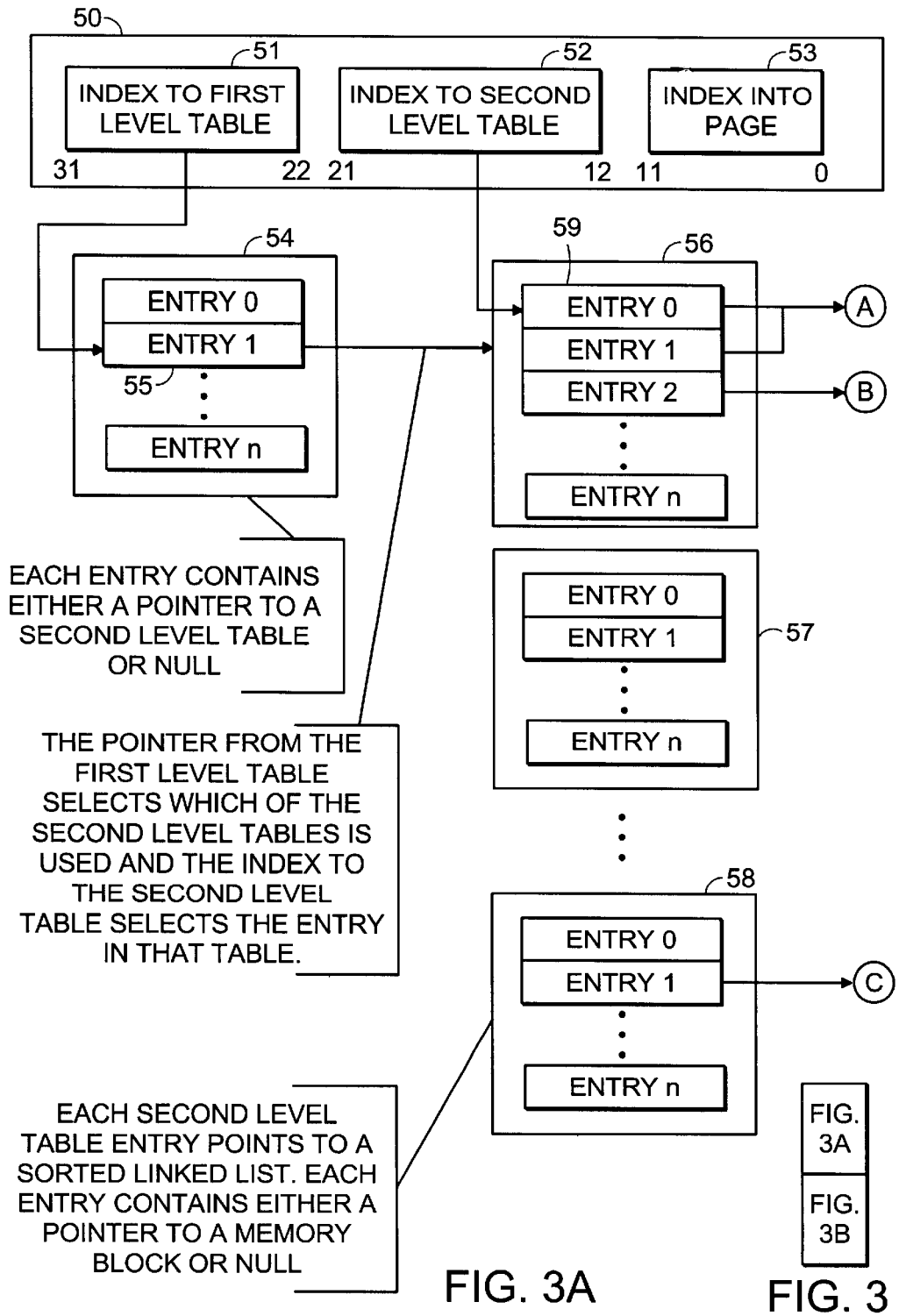
FIG. 3 is a block diagram illustrating the data structures for translating a pointer according the invention.
Figure 3B:
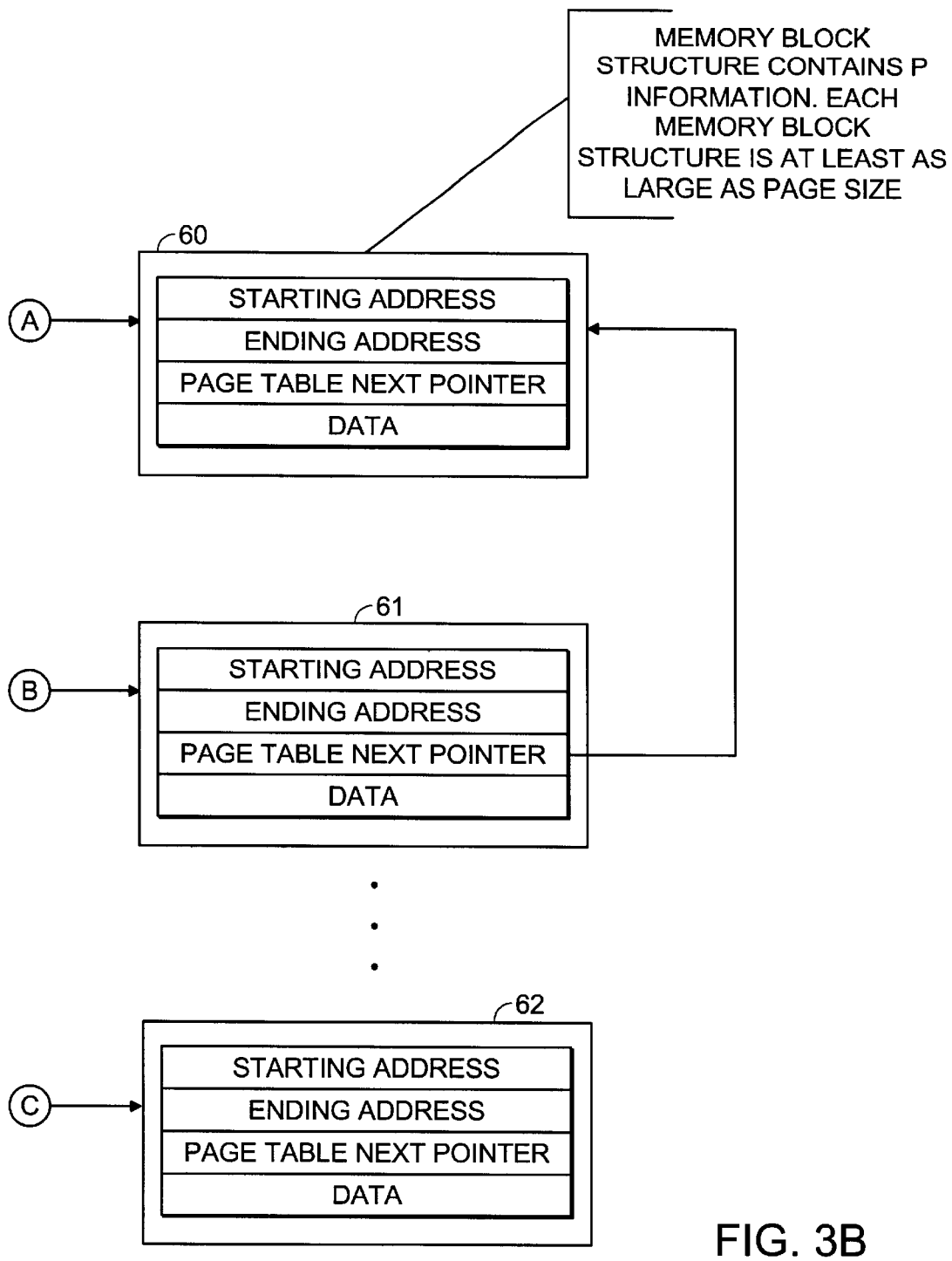

FIG. 3 illustrates one embodiment of the invention for a computer system utilizing 32 bit pointers which are used to directly access memory locations. In this embodiment, for purposes of indexing the translation tables, the pointer 50 is partitioned into three portions 51, 52 and 53. The high 10 bits of the pointer 50 serve as an index 51 into the first-level table 54 pointing to an entry 55. Each entry of the first-level table is either null, meaning the pointer being looked up (call it p) is invalid and the search can stop, or a pointer to a second-level table 56.

The second-level table 56 is indexed using the next highest 10 bits 52 of the pointer 50 to select an entry 59. Each element of this table is either null, meaning that p is invalid and the search can stop, or a pointer to a MemoryBlock data structure 60, 61 or 62 that can be used to find information about p, specifically whether p is within that or an adjacent MemoryBlock.

Because 20 bits of the address have been consumed by the table lookups en route to finding the MemoryBlock, only the low 12 bits 53 have been ignored. Therefore any pointer in the same aligned 4Kbyte block of memory will map to the same page. Of course, the size of the tables used to reach the MemoryBlock can easily be changed, for example using 9 bits of p to index the first-level table and the next 11 bits to index the second-level table. One could use a page table with more than two levels if desired. Whatever the configuration, call the size of the memory specified by the ignored bits the "page size" (4Kbytes in the example given above).

The pointer 50 is used to address memory locations within a MemoryBlock, which need not be aligned with pages. As illustrated in FIG. 3, each MemoryBlock 60 defines a starting address, an ending address, and a page table next pointer. The page table next pointers are set up in such a way that either the MemoryBlock found in the second-level table contains the location to which p points, or the MemoryBlock pointed to by its page table next pointer contains the location to which p points; otherwise p is invalid.

Figure 4:
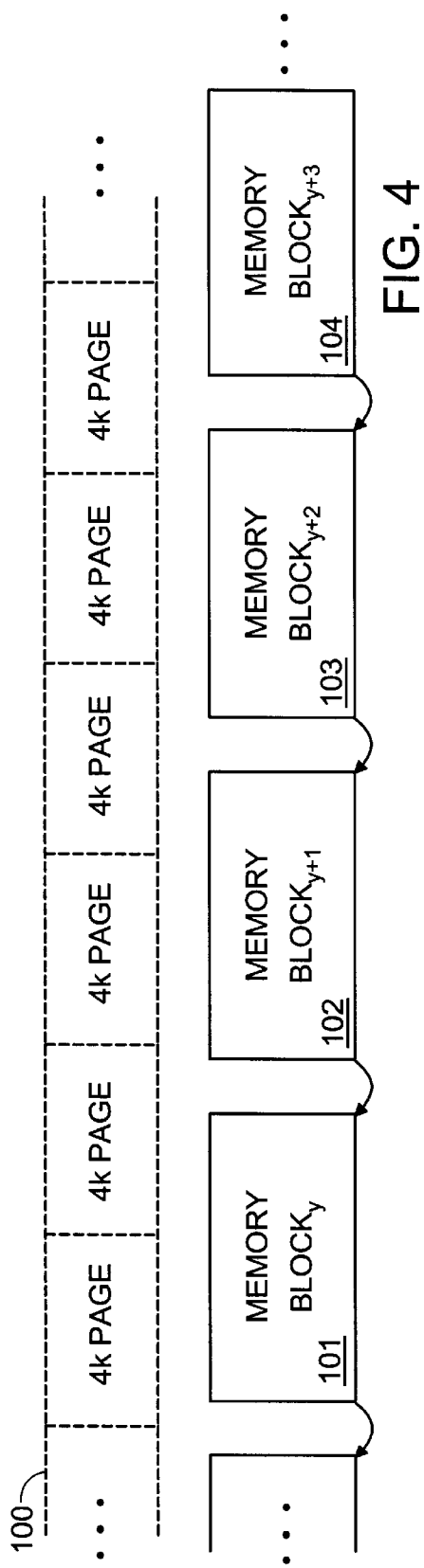
FIG. 4 is a block diagram illustrating the organization of MemoryBlocks in a system according to the invention.

This invariant is maintained by making the following assumption as shown in FIG. 4. First, every MemoryBlock 101, 102, 103, and 104 is at least as big as a page, in this case 4Kbyte in size 100. This implies three things:
  i) at most one MemoryBlock can start on a page,
  ii) at most one MemoryBlock can end on a page, and
  iii) at most two MemoryBlocks can intersect a given page. Therefore, only the two MemoryBlocks identified can contain the data pointed to by the pointer.

The entry in the second-level table for a given page is a sorted linked list of MemoryBlocks, linked by the page table next pointers, such that only the first two MemoryBlocks in the list may possibly intersect that page. There are three cases:
  1) If no MemoryBlock intersects this page, the list will be empty (null). This means the pointer being looked up is invalid.
  2) Else, if a MemoryBlock intersects this page, but no MemoryBlock starts on this page, that block will be the entry in the second-level table (the first entry in the list.)
  3) Else some MemoryBlock starts on this page. It will be the entry in the second-level table (listed first.) If any other MemoryBlock intersects this page, it will be in the page table next field of the MemoryBlock indicated in the entry of the second-level table (and thus will be listed second.) A consequence of these invariants is that MemoryBlock lists are always sorted by address, with higher addresses first. This data structure could be implemented with a single linked list of MemoryBlocks sorted by address, with the second-level tables pointing into this list.

Because finding the MemoryBlock list for a page takes O(1) time, and only the first two entries in the list need ever be examined, this invention allows pointers to be both validated and mapped to their containing MemoryBlock in O(1) time.

Figure 5:
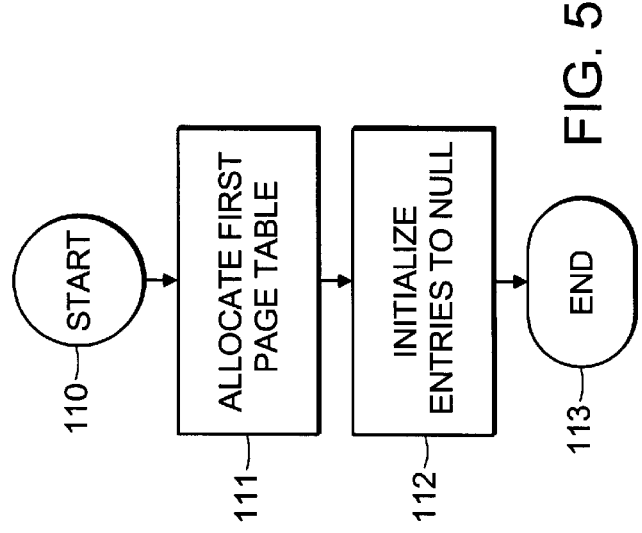
FIG. 5 is a flowchart illustrating the method of initializing the tables utilized in the invention.

FIG. 5 illustrates the steps of initializing the first page table. This table can be implemented as an array of a fixed size that is simply allocated at step 111 and initialized to contain all nulls in step 112.

Figure 6A:
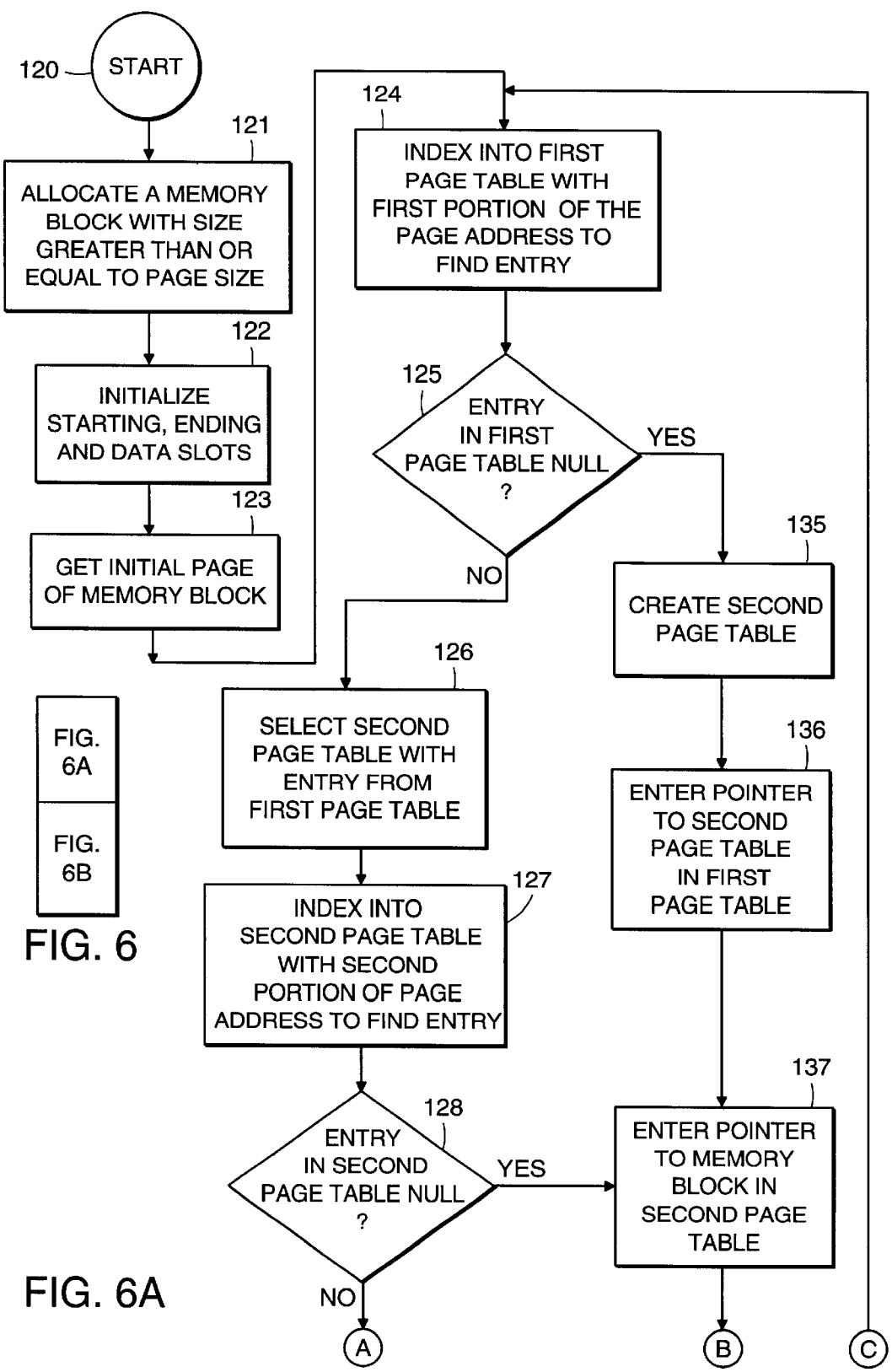
FIG. 6 is a flowchart illustrating the method of allocating a MemoryBlock according to the invention.
Figure 6B:
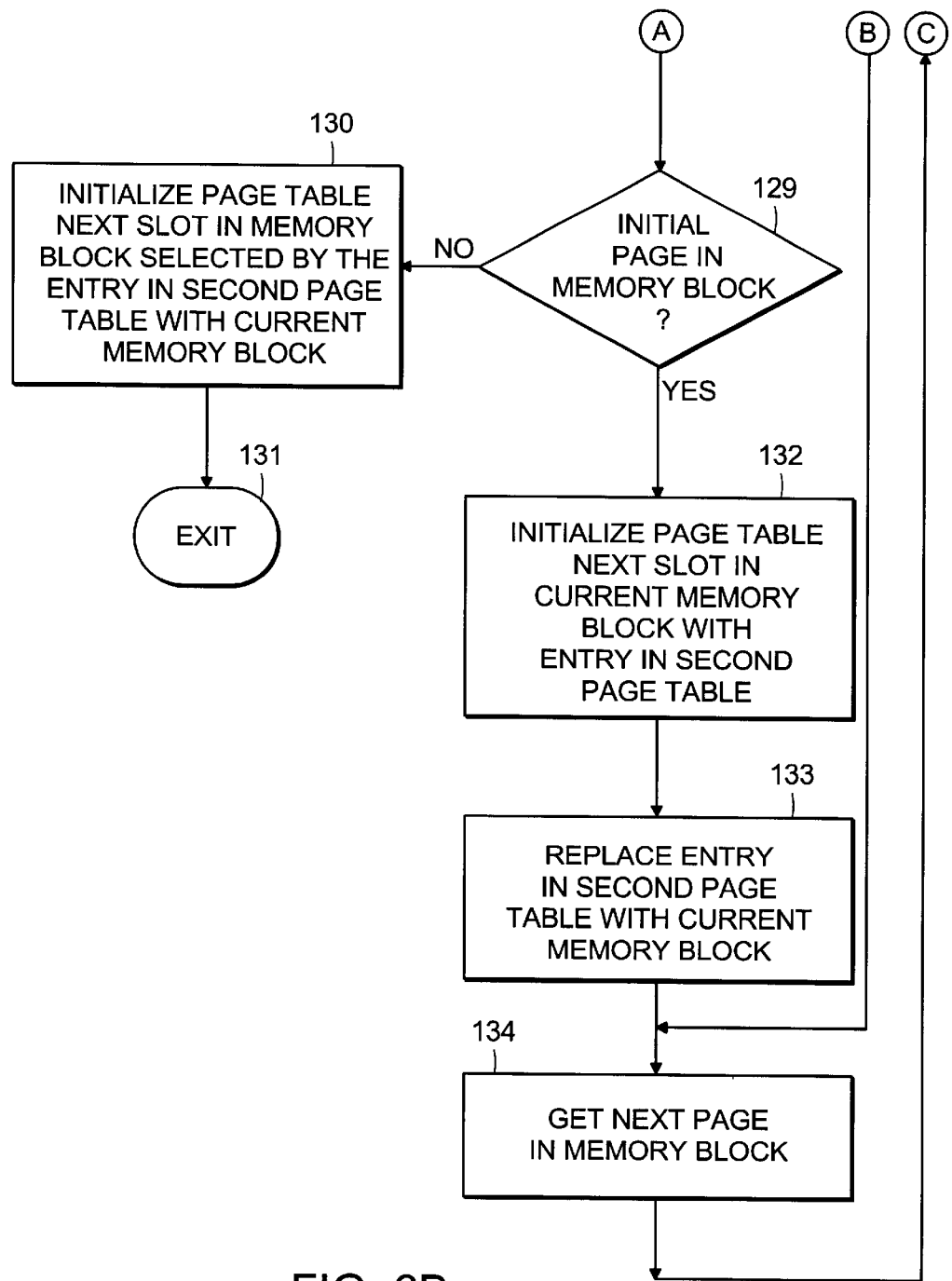

The system creates the remaining structure as it allocates MemoryBlocks. FIG. 6 illustrates the steps in allocating a MemoryBlock. Initially, the system needs to allocate another MemoryBlock 120. A block of memory from the free memory pool is allocated 121, the block being at least as big as the page size and possibly larger depending upon the request. The slots in the MemoryBlock are filled in including the starting address for the data area, the ending address for the data area, the page table next pointer (initially null) and the data 122. The MemoryBlock may be composed of a number of pages, thus the following steps are performed for each page. Initially, the initial page of the MemoryBlock is determined 123.

The first page table is indexed with the first portion of the address for the current page of the MemoryBlock 124. The entry located at this position in the first page table is checked. If it is null 125 (thus indicating that no second page table has been created for this address range), then a sequence of steps will create the necessary information to initialize the entry.

At step 135, the second page table is created and initialized. Next, the pointer to the new second page table is entered into the first page table 136. Finally, an entry is created in this page table for the page of the MemoryBlock in question utilizing the second portion of the address for the page 137.

If, at step 125, there is an entry in the first page table, then the entry is used to find the second page table 126, and the second portion of the page address is used to index into this table 127. If the entry in this table is null 128, then the pointer to the MemoryBlock is entered into this position 137.

If, at step 128, the second page table entry is not null, then there must have been a prior MemoryBlock that was allocated that either started or ended on this page. If this is the first page of the MemoryBlock to be indexed 129, then the prior entry must be for a MemoryBlock that ended on this page. In this case, the page table next pointer in the MemoryBlock is initialized with the entry found in the second page table 132. Then, the entry in the second page table is filled with current MemoryBlock 133. Thus, the entry in the second page table is replaced to point to the current MemoryBlock because it is the MemoryBlock that starts on this page while the former entry in the second page table is stored in the page table next entry of the current MemoryBlock.

If, at 129, the page in question is not the first page for the MemoryBlock, and there is an existing entry in the second page table for this MemoryBlock, then this must be the last page of the MemoryBlock (as only two pages can ever intersect a page, thus one must be the ending page of a MemoryBlock and the other must be a starting page of a MemoryBlock.) In this case, the page table next entry of the MemoryBlock pointed to by the second page table is initialized with the current MemoryBlock 130. Since this is the last page, the process exits 131.

Thus, after either step 137 or step 133, the next step is to get the next page in the MemoryBlock to be indexed 134. The process is then repeated for this page of the MemoryBlock by going back to step 124.

Figure 7:
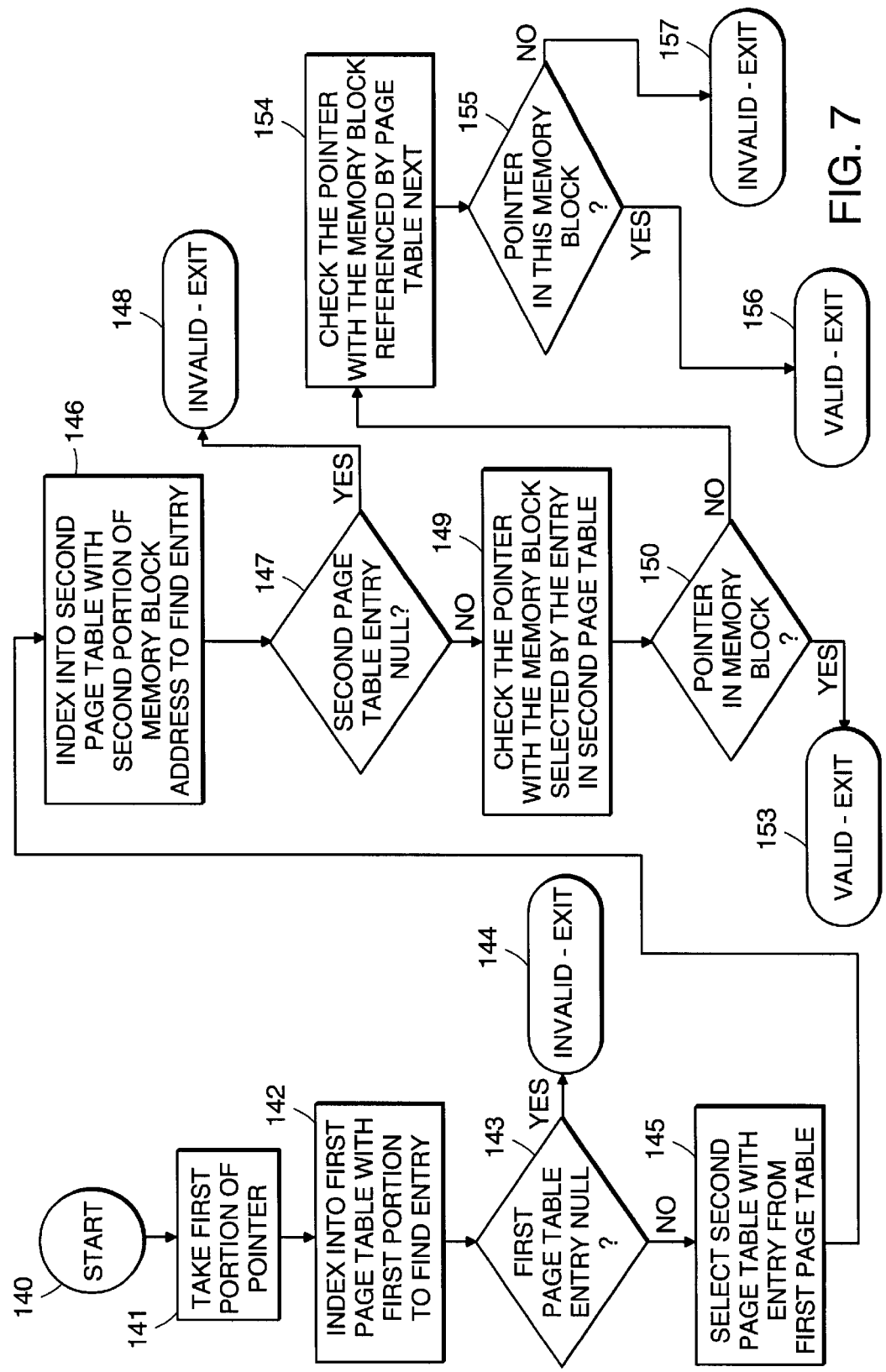
FIG. 7 is a flowchart illustrating the method of checking a pointer according to the invention.

A pointer is checked by utilizing the structures thus created. FIG. 7 illustrates the steps in checking a pointer for validity. Initially, the first portion of the pointer (51 of FIG. 3) is obtained 141 used to index into the first page table 142. the entry in the first page table is checked, and if it is null the pointer is invalid and the operation exits. If the entry is not null, then it is used to find the second page table 145. Now the second portion of the pointer (52 of FIG. 3) is used to index into this second page table 146.

The entry in the second page table is checked to determine if it is null 147. If it is, the pointer is invalid and the operations exits 148. If the pointer is not null, then the memoryBlock pointed to by this entry is examined 149 to determine if the pointer is within that MemoryBlock and is thus valid 150. If the pointer is valid, then the operation so signals and then exits 153.

If the pointer is not in the MemoryBlock, it still may be in the MemoryBlock referenced to by the page table next entry 154. If the pointer is in this MemoryBlock, the pointer is valid; the operation so signals and exits 156. Otherwise, the pointer is invalid and the operation so signals and exits. Once all the pointers have been checked, the unused memory can be freed for reallocation.

Figure 8:
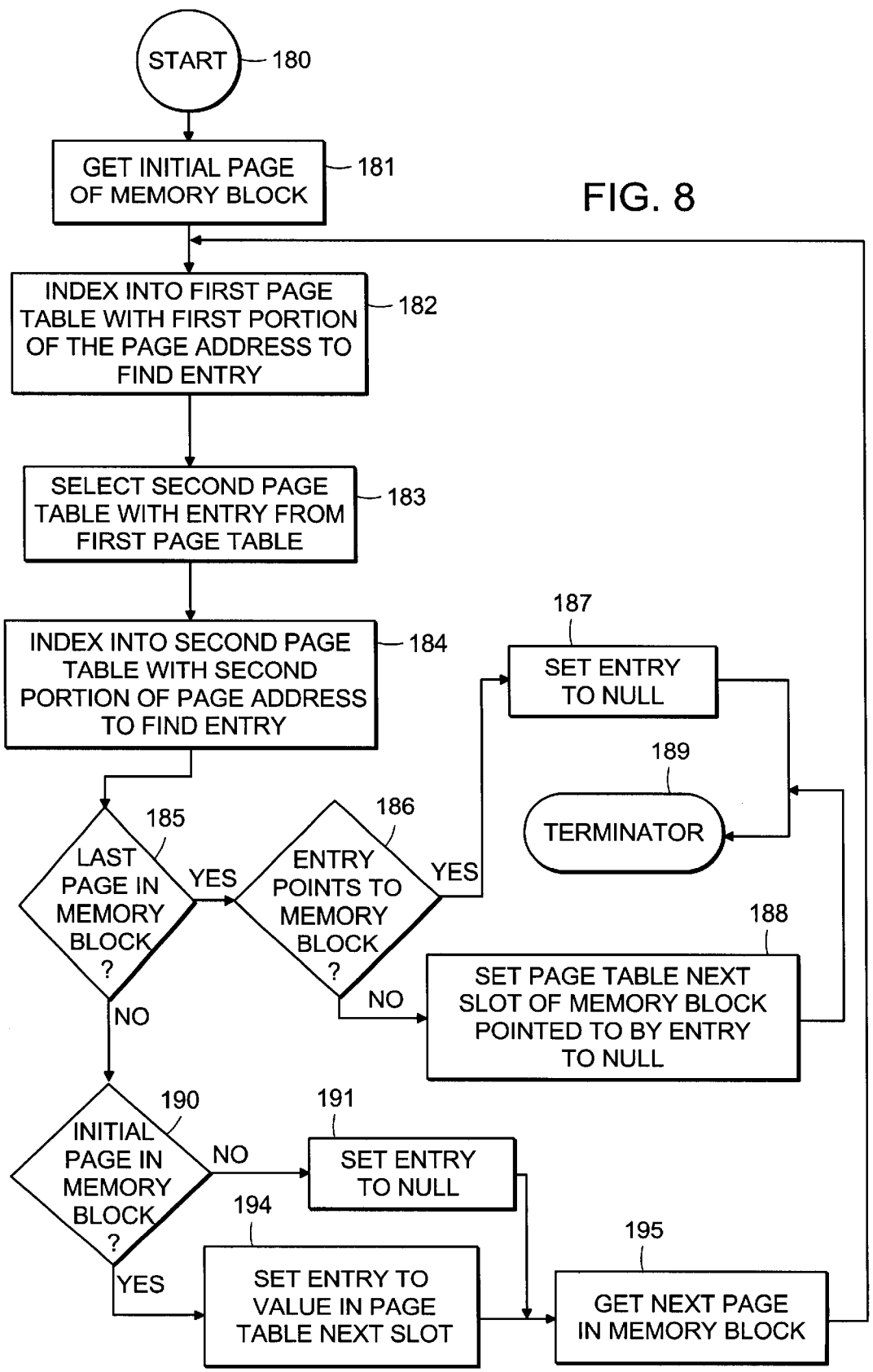
FIG. 8 is a flowchart illustrating the method of de-allocating a MemoryBlock according to the invention.

During normal operation of the system, memory blocks are allocated and reclaimed as they are used. As one step in the reclamation of the storage allocated for a memory block, the entries in the page tables must be updated to remove references to the actual memory block. FIG. 8 illustrates the step necessary in deleting references to a memory block.

Initially, the process 180 starts by deriving the first page to the memory block, 181. The first page table is indexed with the first portion of the address for the current page and the entry is retrieved 182. The entry is used to select the second page table 183. The second page table is then indexed utilizing the second portion of the address to the current page and the entry is retrieved.

The current page is tested to see if it is the last page for the memory block (or the only page) 185. If so, the entry from the second page table is checked to see if it points to the memory block we are deleting 186. If so, we set the second page table entry to null 187 and end the process 189. If the entry in the second page table points to a different memory block from the one we are deleting 186, then this different memory block must have its page table next pointer pointing to the memory block being deleted. This page table next entry is thus set to null 188 and the process is complete 189.

If it is determined that this page is not the last page in the memory block 185, then we check to see if this is the first page in the memory block 190. If it is not, we set the entry in the second page table to null 191. If it is the first entry 190, then we need to update the entry in the second page table to contain the value in the page table next slot of the memory block being deleted 194. In either case, once the entry in the second page table is updated the next page in the memory block is determined 195 and the process repeats through the remaining pages.

As a final process in reclaiming allocated storage, second level page tables may also be deleted once all the entries in a particular second page table become null (signifying that all the memory blocks indexed via that table have been reclaimed). This can be achieved by walking through the first and second page table structures.

In addition, though the present invention has been described with respect to the Curl™ language, it is not limited to this context, and may be used in connection with any programming language. Finally it is noted that the process steps shown in FIGS. 5–8 need not necessarily be executed in the exact order shown, and that the order shown is merely one way for the invention to operate. Thus, other orders of execution are permissible, so long as the functionality of the invention is substantially maintained.

The present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for indicating a valid or invalid status of a pointer in a computer system adapted to have
   a first page table, a set of zero or more intermediate page table sets, and a last set of page tables forming a hierarchy of tables,
   each of the first page table, the last page tables and the set of zero or more intermediate page table sets indexed via portions of the pointer,
   each of the first page table and the set of zero of more intermediate page table sets adapted to contain references to next page tables,
   the last page table adapted to contain a reference to a memory block, the memory block comprising information relating to a data size and a next memory block,
   the method comprising the steps of:
   a) indexing into the first page table via a first portion of the pointer to derive a first page table reference;
   b) if the first page table reference is null, indicating the invalid status of the pointer and skipping the remaining steps;
   c) if no page tables exist in the set of zero or more page tables, then selecting a last page table via the first page table reference and skipping to step e);
   d) if page tables exist in the set of zero or more page tables, then sequentially selecting members of the set of zero or more page tables via a combination of the references to next page tables and portions of the pointer, and if any reference to next page tables is null indicating the invalid status of the pointer and skipping the remaining steps, otherwise selecting a last page table via the final derived reference to next page tables;
   e) indexing into the selected last page table via a last portion of the pointer to derive a reference to a selected memory block;
   f) if the reference to the selected memory block is null, indicating the invalid status of the pointer and skipping the remaining steps;
   g) checking the selected memory block for the presence of the pointer and if present indicating the valid status of the pointer and skipping the remaining steps; and
   h) checking a next memory block referenced by the next page table of the selected memory block for the presence of the pointer and if present, indicating the valid status of the pointer otherwise indicating the invalid status of the pointer.

2. The method of claim 1 wherein the data size is at least as large as a predefined page size.

3. The method of claim 2 wherein the predefined page size is determined by a page size portion of the pointer.

4. The method of claim 3 wherein the page size portion of the pointer is not used for indexing into the first page table, the set of zero or more page tables or the last page table.

5. Computer-executable process stored on a computer-readable medium, the computer-executable process steps to indicate a valid or invalid status of a pointer in a computer system having a first page table, a set of zero or more intermediate page table sets, and a last set of page tables forming a hierarchy of tables, each of the first page table, the last page tables and the set of zero or more intermediate page table sets indexed via portions of the pointer, each of the first page table and the set of zero of more intermediate page tables sets adapted to contain references to next page tables, the last page table adapted to contain a reference to a memory block, the memory block comprising information relating to a data size and a next memory block, the computer-executable process steps comprising:
- a) code to index into the first page table via a first portion of the pointer to derive a first page table reference;
- b) code to determine if the first page table reference is null, indicate the invalid status of the pointer and skip the remaining steps;
- c) code to determine that if no page tables exist in the set of zero or more page tables, to select a last page table via the first page table reference and skip to step e);
- d) code to determine if page tables exist in the set of zero or more page tables, then to sequentially select members of the set of zero or more page tables via a combination of the references to next page tables and portions of the pointer, and if any reference to next page tables is null to indicate the invalid status of the pointer and to skip the remaining steps, otherwise to select a last page table via the final derived reference to next page tables;
- e) code to index into the selected last page table via a last portion of the pointer to derive a reference to a selected memory block;
- f) code to determine if the reference to the selected memory block is null, to indicate the invalid status of the pointer and skip the remaining steps;
- g) code to check the selected memory block for the presence of the pointer and if present to indicate the valid status of the pointer and skipping the remaining steps; and
- h) code to check a next memory block referenced by the next page table of the selected memory block for the presence of the pointer and if present, indicate the valid status of the pointer otherwise indicate the invalid status of the pointer.

6. The computer-executable process stored on a computer-readable medium of claim 5 wherein the data size is at least as large as a predefined page size.

7. The computer-executable process stored on a computer-readable medium of claim 6 wherein the predefined page size is determined by a page size portion of the pointer.

8. The computer-executable process stored on a computer-readable medium of claim 7 wherein the page size portion of the pointer is not used for indexing into the first page table, the set of zero or more page tables or the last page table.

9. An apparatus to indicate a valid or invalid status of a pointer, the apparatus comprising:
- a memory which stores computer-executable process steps and is adapted to contain a first page table, a set of zero or more intermediate page table sets, and a last set of page tables forming a hierarchy of tables, each of the first page table, the last page tables and the set of zero or more intermediate page table sets indexed via portions of the pointer, each of the first page table and the set of zero of more intermediate page tables sets adapted to contain references to next page tables, the last page table adapted to contain a reference to a memory block, the memory block comprising information relating to a data size and a next memory block; and a processor which executes the process steps so as to:
  - a) index into the first page table via a first portion of the pointer to derive a first page table reference;
  - b) determine if the first page table reference is null, indicate the invalid status of the pointer and skipping the remaining steps;
  - c) determine if no page tables exist in the set of zero or more page tables, then select a last page table via the first page table reference and skipping to step e);
  - d) determine if page tables exist in the set of zero or more page tables, then sequentially select members of the set of zero or more page tables via a combination of the references to next page tables and portions of the pointer, and if any reference to next page tables is determined as null to indicate the invalid status of the pointer and skip the remaining steps, otherwise select a last page table via the final derived reference to next page tables;
  - e) index into the selected last page table via a last portion of the pointer to derive a reference to a selected memory block;
  - f) determine if the reference to the selected memory block is null, then indicate the invalid status of the pointer and skip the remaining steps;
  - g) check the selected memory block for the presence of the pointer and if present indicate the valid status of the pointer and skip the remaining steps; and
  - h) check a next memory bloc k referenced by the next page table of the selected memory block for the presence of the pointer and if present, indicate the valid status of the pointer otherwise indicate the invalid status of the pointer.

10. The apparatus of claim 9 wherein the data size is at least as large as a predefined page size.

11. The apparatus of claim 10 wherein the predefined page size is determined by a page size portion of the pointer.

12. The apparatus of claim 11 wherein the page size portion of the pointer is not used to index into the first page table, the set of zero or more page tables or the last page table.

13. A data structure in computer memory for indicating status of memory pointers comprising:
- a table of memory pages indexed by each pointer, an indexed entry in the table pointing to a memory block which contains at least a portion of the indexed page; and
- memory blocks, including memory blocks of multiple pages, into which the memory pointers point, the memory block to which the indexed table entry points indicating whether the pointer is valid.

14. A data structure as claimed in claim 13 wherein the table entry points to only one memory block overlapping the indexed page and that memory block, to which an indexed table entry points, itself points to any other memory block overlapping the indexed page.

15. A data structure as claimed in claim 14 wherein the size of each memory block is at least the size of one page.

16. A data structure as claimed in claim 15 further comprising a first level table indexed by a portion of each pointer, an indexed entry in the first level table pointing to the table of memory pages.

17. A data structure as claimed in claim 14 further comprising a first level table indexed by a portion of each pointer, an indexed entry in the first level table pointing to the table of memory pages.

18. A method of indicating status of memory pointers comprising:
   indexing a table of memory pages with a memory pointer;
   locating a memory block into which the memory pointer points, the memory block including at least a portion of the indexed page and multiple pages; and
   from information in the located memory block, determining whether the pointer is valid.

19. A method as claimed in claim 18 wherein the table entry points to only one memory block overlapping the indexed page and that memory block, to which an indexed table entry points, itself points to any other memory block overlapping the indexed page.

20. A method as claimed in claim 19 wherein the size of each memory block is at least the size of one page.

21. A method as claimed in claim 20 further comprising indexing a first level table by a portion of each pointer, an indexed entry in the first level table pointing to the table of memory pages.

22. A method as claimed in claim 19 further comprising indexing a first level table by a portion of each pointer, an indexed entry in the first level table pointing to the table of memory pages.

23. Apparatus for indicating status of memory pointers comprising:
   memory which stores computer executable code and data; and
   a processor which operates on the code and the data;
   the data comprising:
      a table of memory pages indexed by each pointer, an indexed entry in the table pointing to a memory block which contains at least a portion of the indexed page; and
      memory blocks, including memory blocks of multiple pages, into which the memory pointers point, the memory block to which the indexed table entry points indicating whether the pointer is valid.

24. Apparatus as claimed in claim 23 wherein the table entry points to only one memory block overlapping the indexed page and that memory block, to which an indexed table entry points, itself points to any other memory block overlapping the indexed page.

25. Apparatus as claimed in claim 24 wherein the size of each memory block is at least the size of one page.

26. Apparatus as claimed in claim 25 further comprising a first level table indexed by a portion of each pointer, an indexed entry in the first level table pointing to the table of memory pages.

27. Apparatus as claimed in claim 24 further comprising a first level table indexed by a portion of each pointer, an indexed entry in the first level table pointing to the table of memory pages.

\* \* \* \* \*